US008364291B2

(12) United States Patent
Cook et al.

(10) Patent No.: US 8,364,291 B2
(45) Date of Patent: Jan. 29, 2013

(54) METHOD AND APPARATUS FOR PROVIDING REDUNDANCY IN AN INDUSTRIAL CONTROL SYSTEM

(75) Inventors: William B. Cook, Northfield, OH (US); David A. Karpuszka, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1058 days.

(21) Appl. No.: 12/242,223

(22) Filed: Sep. 30, 2008

(65) Prior Publication Data
US 2009/0125122 A1 May 14, 2009

Related U.S. Application Data

(60) Provisional application No. 60/987,604, filed on Nov. 13, 2007.

(51) Int. Cl.
*G05B 9/03* (2006.01)
*G05B 15/02* (2006.01)
(52) U.S. Cl. ............................ 700/82; 700/20; 700/25
(58) Field of Classification Search ............... 700/9, 11, 700/20, 23, 24, 25, 82
See application file for complete search history.

(56) References Cited

U.S. PATENT DOCUMENTS

| | | | | |
|---|---|---|---|---|
| 4,038,533 A | * | 7/1977 | Dummermuth et al. | ......... 700/18 |
| 4,319,338 A | * | 3/1982 | Grudowski et al. | ............... 700/9 |
| 4,521,871 A | * | 6/1985 | Galdun et al. | ................. 700/82 |
| 5,313,386 A | | 5/1994 | Cook et al. | |
| 5,392,424 A | | 2/1995 | Cook | |
| 5,768,141 A | * | 6/1998 | Hanaoka et al. | ............... 700/214 |
| 5,777,874 A | | 7/1998 | Flood et al. | |
| 5,912,814 A | * | 6/1999 | Flood | .............................. 700/17 |
| 5,933,347 A | | 8/1999 | Cook et al. | |
| 5,966,300 A | | 10/1999 | Flood et al. | |
| 5,966,301 A | | 10/1999 | Cook et al. | |
| 5,966,304 A | | 10/1999 | Cook et al. | |
| 6,411,857 B1 | * | 6/2002 | Flood | .............................. 700/82 |
| 6,760,634 B2 | | 7/2004 | Cook et al. | |
| 7,613,108 B2 | * | 11/2009 | Takehara et al. | ............... 370/222 |
| 2007/0147232 A1 | * | 6/2007 | Takehara et al. | ............... 370/217 |

* cited by examiner

*Primary Examiner* — Charles Kasenge
(74) *Attorney, Agent, or Firm* — Boyle Fredrickson, S.C.; Scott Speroff; John M. Miller

(57) ABSTRACT

An industrial control system implementing a multi-tasking operating system employs a primary and secondary controller each having a processor and an I/O data table. The processors are configured to execute one or more priority ranked programs. A tracking of changes in the I/O data table of the primary processor is used to independently track changes to controller specific data that has been changed and program specific data that has been changed and to transmit controller specific data that has been changed by any program and program specific data that has been changed only for completed programs to the secondary processor.

18 Claims, 8 Drawing Sheets

| OUTPUT | PRIMARY I/O TABLE | SECONDARY I/O TABLE |
|---|---|---|
| 0 | 0 | 0 |
| 1 | 1 | 0 |
| 1 | X | 0 |
| 0 | 0 | 0 |
| 1 | 1 | 1 |

METHOD AND APPARATUS FOR PROVIDING REDUNDANCY IN AN INDUSTRIAL CONTROL SYSTEM

CROSS-REFERENCE TO RELATED APPLICATIONS

This application claims the benefit of U.S. Provisional Application No. 60/987,604, filed Nov. 13, 2007, hereby incorporated by reference in its entirety.

BACKGROUND OF THE INVENTION

The present invention relates to industrial controllers and in particular to an industrial controller system having a secondary controller providing back-up control capability. More particularly, the present invention relates to systems and methods for implementing hardware tracking in an industrial control system.

Industrial controllers are special purpose computers used for controlling factory automation and the like. Under the direction of stored programs, a processor of the industrial controller examines a series of inputs reflecting the status of a controlled process and changes outputs affecting control of the controlled process. The stored control programs may be continuously executed in a series of execution cycles, executed periodically, or executed based on events.

The inputs received by the industrial controller from the controlled process and the outputs transmitted by the industrial controller to the controlled process are normally passed through one or more input/output (I/O) modules which serve as an electrical interface between the controller and the controlled process. The inputs and outputs are recorded in an I/O data table in processor memory. Input values may be asynchronously read from the controlled process by specialized circuitry. Output values are written directly to the I/O data table by the processor, and then communicated to the controlled process by the specialized communications circuitry.

Industrial controllers must often provide uninterrupted and reliable operation for long periods of time. One method of ensuring such operation is by using redundant, secondary controller components (including processors) that may be switched in to replace primary controller components while the industrial controller is running. In the event of a failure of a primary component, or the need for maintenance of the components, for example, the secondary components may be activated to take over control functions. Maintenance or testing of the control program may be performed with the primary processor reserving the possibility of switching to the secondary processor (and a previous version or state of the control program) if problems develop.

Ideally, the switch-over between controllers or their components should occur without undue disruption of the controlled process. For this to be possible, the secondary processor must be running or waiting to run the same program (and maintaining its current state) and must be working with the same data in its I/O data table as in the primary processor. Although tracking data in the I/O data table is described, it should be understood that the data tracking may include tracking any other type of data, such as variables that are used in a program. Accordingly, although I/O data table is used herein, it should be understood that this data may include any data being tracked and modified by the processors in executing programs.

A hardware tracking table is implemented as a specialized memory where, as writes are done to memory, bits are set in the hardware tracking table with each bit corresponding to a block of bytes in memory. A primary controller can track some or all of its memory writes so that it can transfer that information to a secondary controller that is not actually running the programs, merely tracking which programs are being executed in the primary controller. Accordingly, if a failure occurs in the primary controller, the secondary controller assumes the primary controller's role.

In a multitasking environment, hardware tracking can become much more complicated. Traditionally, one large tracking table has been used to track all information. Using a large tracking table in a multi-tasking environment, it is difficult to track and distinguish between the changes made by a first process and the changes made by a second process. Further, higher priority tasks may send changes that lower priority tasks have made such that the tasks transferring the data to the secondary controller are slowed significantly.

As an example of a difficulty that can arise due to task preemption, a counter may have incremented in a lower priority task where the lower priority task has been preempted by a higher priority task. The higher priority task would send the incremented counter value to the secondary controller. If a switchover to the secondary controller occurred at that point, the lower priority task would re-increment the counter as the lower priority task is reset during the switchover since it did not complete in the primary prior to the switchover occurring.

All changes are tracked as a single group such that one program's data cannot be differentiated from another. Therefore, when a higher priority task preempts a lower priority task, the higher priority task may transfer any or all of the data that was changed by the lower priority task. This transfer may include a significant amount of data and may significantly slow the completion time for the high priority task. This is undesirable since high priority tasks are often time-critical and yet they become a vehicle for transferring a majority of the data changes.

What is needed is a system and method for implementing high priority tasks that decouples the data transfer of any task from the data changes made by other tasks. What is further needed is such a system and method where higher priority tasks transfer data associated with only completed lower priority tasks.

BRIEF SUMMARY OF THE INVENTION

The present inventors have recognized that the tracking of all data tag writes in an industrial controller as one group introduces inefficiencies, and that efficiencies may be realized by differentiating one program's data from another. Additional functionality added to an ASIC will allow an additional area, dedicated to maintaining a set of program-scoped tags, to be separately tracked and searched.

Specifically, the present invention provides a primary industrial controller exchanging input and output signals with a controlled process and communicating with a second industrial controller over a link. The industrial controller includes a memory holding at least one user program describing the control of the controlled process, an I/O data table holding values of the output signals exchanged with the controlled process, and a flag table having controller scoped flags and program-scoped flags with the controller scoped flags indicating changes to the I/O data table that are shared by one or more user programs and the program-scoped flags indicating changes to the I/O data table specific to one user program caused by execution of the specific user program. The industrial controller further includes a processor communicating with the memory and operating to execute the user program to write values of the output signals to the I/O data table according to the user program, set controller-scoped flags in the flag table indicating changes in the I/O data table caused by execution of user programs, set program-scoped flags in the flag table indicating changes in the I/O data table caused by execution of a particular user program, and at a second predetermined time after the first predetermined time, transmit to the secondary industrial controller the values of output signals in the I/O data table that have changed as indicated by the set controller-scoped flags of the flag table and the values of output signals in the I/O data table that have changed as indicated by the set program-scoped flags of the flag table for programs that have completed. At an arbitrary switch-over time, the primary industrial controller ceases execution of the user program and the secondary industrial controller begins execution of the user program, the secondary industrial controller using transmitted values of the output signals.

According to an exemplary embodiment, the second predetermined time is following a sync point for a completed user program. Further, the I/O data table is divided into ranges of addresses and wherein the controller-scoped flags are maintained in a first contiguous range of addresses and/or where the program-scoped flags are maintained in a second contiguous range of addresses.

According to another exemplary embodiment, the changes in the I/O data table are detected by write operations to the I/O data table. The processor may further reset the flags of the flag table as the changed values of the I/O table are transmitted to the secondary industrial controller.

According to yet another exemplary embodiment, the processor further operates to, at a second predetermined time after transmitting the changed values of the I/O data table, transmits to the secondary industrial controller an unwind signal indicating completion of the transmission of changed values of the I/O table. The processor may be configured to send the unwind command when a search and transfer of the controller-scoped flags is completed. The processor may be configured to send the unwind command when a search and transfer of the program-scoped flags is completed and completion of the search and transfer of the controller-scoped flags is detected.

Additionally, the present invention provides a method of providing a back-up for a primary industrial controller exchanging input and output signals with a controlled process and communicating with a secondary industrial controller over a link, the primary industrial controller including a processor communicating with a memory, the memory holding a user program for describing the control of the controlled process, an I/O data table holding values of the input and output signals exchanged with the controlled process, and a flag table holding flags indicating changes to the I/O data table. The method includes the steps of, after a first predetermined time executing the user program to read and write to the I/O data table according to the user program, setting controller-scoped flags in the flag table indicating changes to controller data in the I/O data table caused by control of the controlled process, setting program-scoped flags in the flag table indicating changes to program-specific data in the I/O data table caused by control of the controlled process, at a second predetermined time after the first predetermined time, communicating to the secondary processor only the values of the I/O data table that have changed as indicated by the set flags of the flag table to the secondary processor, and at an arbitrary switch-over time, causing the primary industrial controller to cease execution of the user program and the secondary industrial controller to begin execution of the user program, with the secondary industrial controller using transmitted values of the output signals.

These particular features and advantages may apply to only some embodiments falling within the claims and thus do not define the scope of the invention.

DETAILED DESCRIPTION OF THE PREFERRED EMBODIMENT

Figure 1:
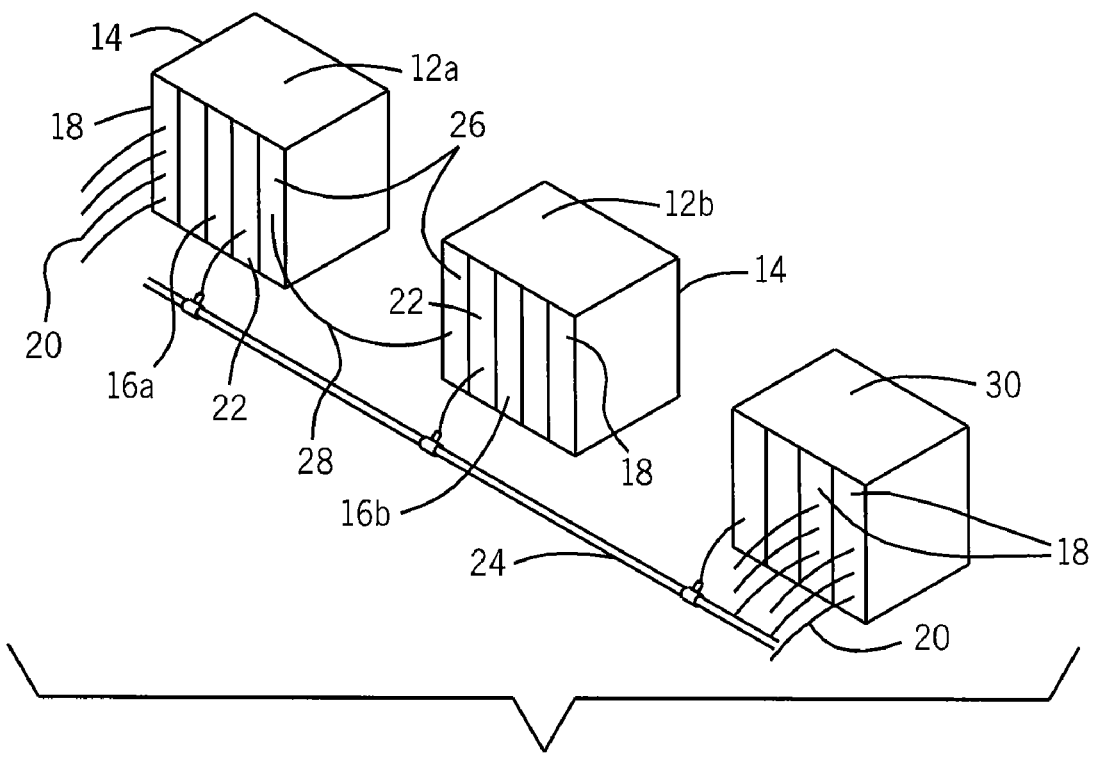
FIG. 1 is a simplified perspective view of an industrial controller employing a primary and secondary controller communicating on a common link with a remote I/O rack and a separate communication bus for I/O data table transfer.

Referring now to FIG. 1, an industrial control system of the present invention includes primary controller 12(a) and secondary controller 12(b) housed in separate racks 14. Each rack 14 holds processor modules 16(a) and 16(b), respectively, to be described in detail below.

Within the racks 14 of primary controller 12a are I/O modules 18 having I/O lines 20 communicating with a controlled process (not shown) for transferring input and output signals between the controllers 12(a) and the controlled process. In addition, both the racks 14 include communication modules 22 connecting the controllers 12(a) and 12(b) to a common general purpose link 24 and communication modules 26 connecting controllers 12(a) and 12(b) to a special dedicated communication link 28. The general purpose communication link 24 may connect to an I/O rack 30 having additional I/O modules 18 and I/O lines 20.

The dedicated communication link is used for the communication of I/O data between the processor modules 16(a) and 16(b) and the communication of information coordinating a switch-over between the operation of the primary and secondary controllers 12(a) and 12(b).

Figure 2:
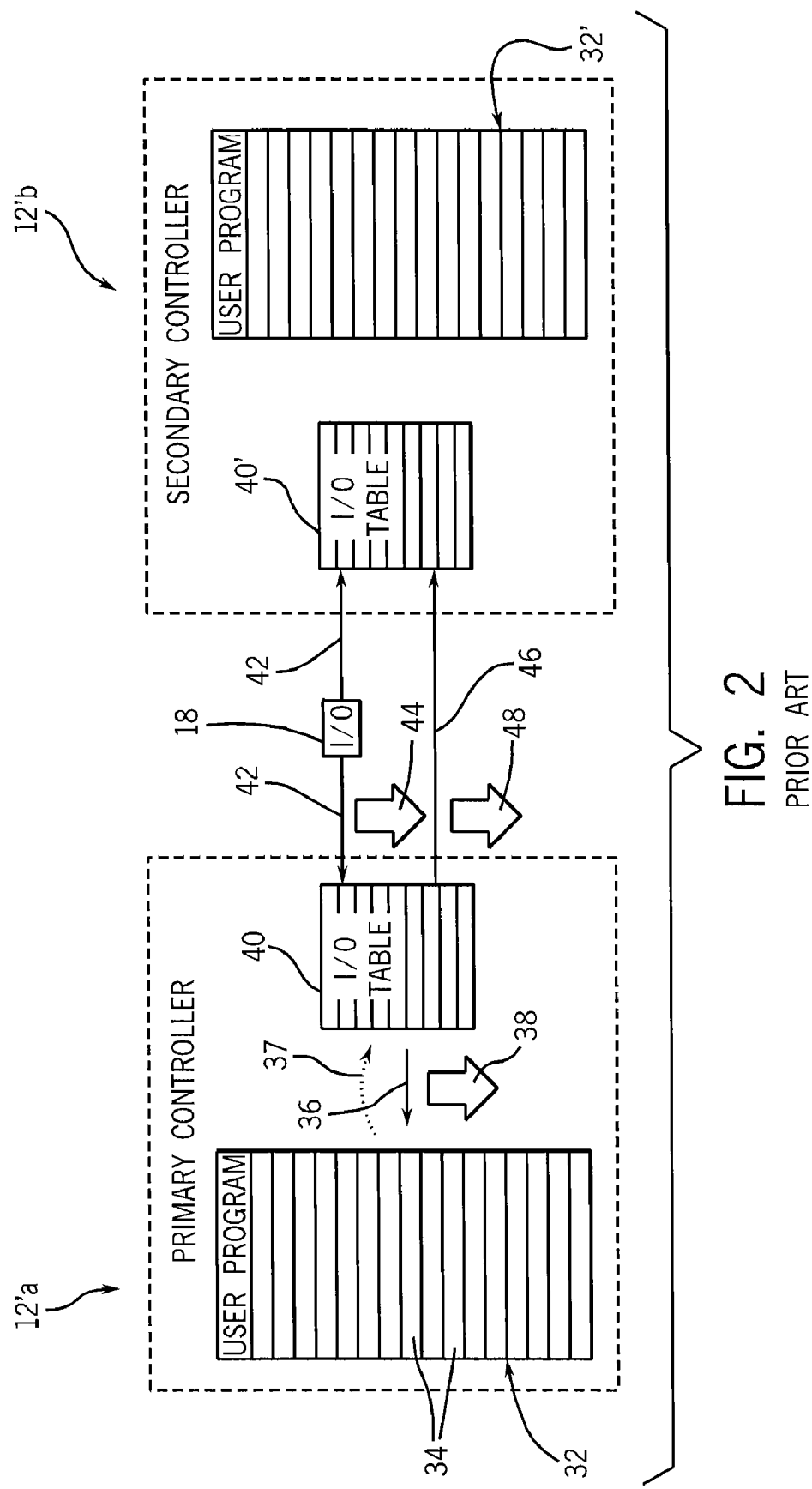
FIG. 2 is a schematic representation of prior art asynchronous transfer of data between I/O data tables of a primary and secondary industrial controller.

Referring now to FIGS. 1 and 2 in a prior art system, a primary controller 12(a)' and secondary controller 12(b)' both include copies of a user program 32 comprised of a sequence of instructions 34. During operation of the primary controller 12(a)', instructions 34 are executed in repeated execution cycles 38 at a scan point 36 scanning through the user program 32 writing data 37 to an I/O data table 40.

At the same time, I/O data table 40 is asynchronously updated over link 24 with current input values 42 from I/O modules 18 as indicated by arrow 44. Input values 42 are also received via link 24 at I/O data table 40' in the secondary controller 12(b)'. Output values in the I/O data table 40 may be transmitted (not shown) to the I/O 18 asynchronously or synchronously to the execution cycles 38 of the user program.

In the prior art, the data of the I/O data table 40 is asynchronously transferred as indicated by arrow 46 to the I/O data table 40' in secondary controller 12(b)'. This transfer of data provides the secondary controller 12(b)' with an updated I/O data table 40' in the event of a switch-over of control from the primary controller 12(a)' and proceeds through the data tables 40 and 40' in a scanning process 48. Although previous solutions have improved the transfer, the present application improves this transfer as described hereinbelow.

Generally the scanning 48 of the I/O data transfer is asynchronous to the execution cycle 38 of the user program 32. Accordingly, at the completion of an execution cycle 38 of the user program 32, the I/O data table 40' will still contain some data as changed in a previous execution cycle 38 of the user program and some data reflecting the most recent execution cycle 38 of the user program 32. Further, because the user program is executed during the data transfer, some of the data in the I/O data table 40' reflecting the most recent execution cycle of the user program will no longer be current.

When control is switched to the secondary controller 12(b)', the user program 32' of secondary controller 12(b)' will begin an execution cycle of the user program 32' operating on a set of data in I/O data table 40' different from any set of data seen by the user program 32 of the primary controller 12(a)' at the beginning of its execution cycle 38. This time fragmentation of the data of the I/O data table 40' can produce anomalous behavior of the controlled process.

Figures 3, 4:
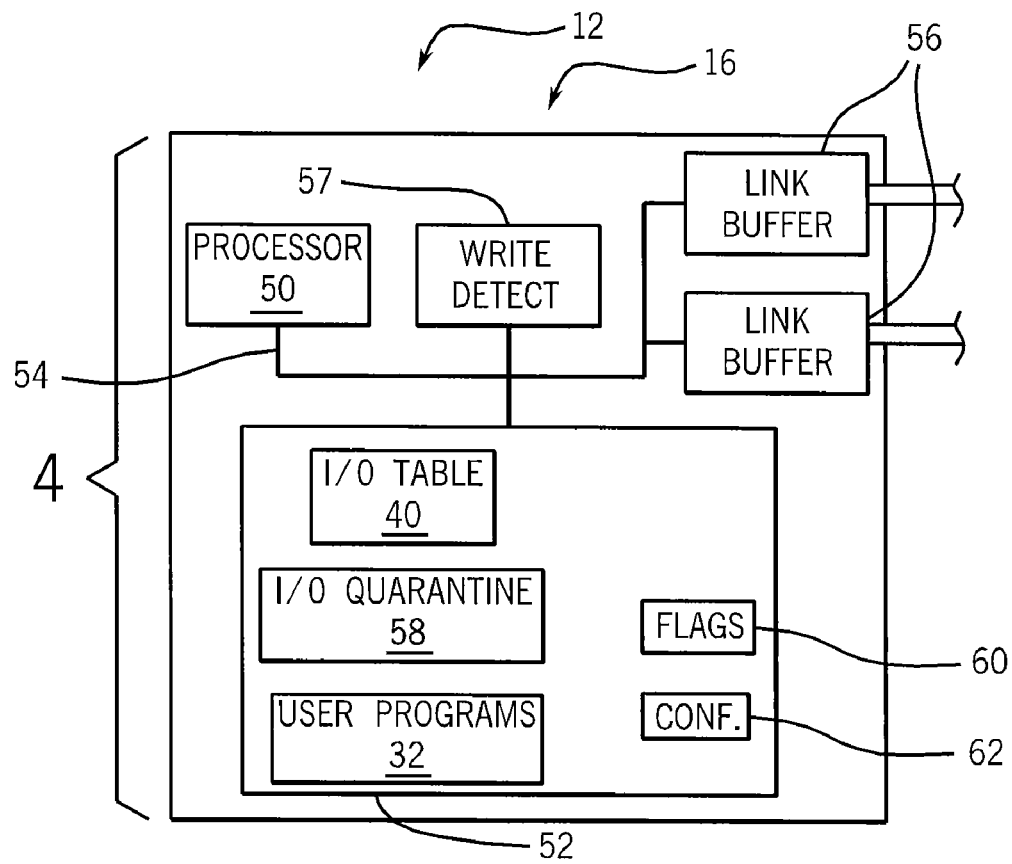
FIG. 3 is a table holding sequential output values of a prior art controller such as produces a rapid switching of an output to a previous state and then back again, such as is termed a data bump.
FIG. 4 is a block diagram of principal components of the controller of the present invention usable either as a primary or secondary controller.

Further, referring now to FIGS. 2 and 3, a second problem may arise from the lack of coordination between the transfer of data from the I/O data table 40 to the I/O modules 18, and the transfer of data from I/O data table 40 to the I/O data table 40'. This problem is illustrated in the table of FIG. 3, where the first column represents a single binary output value to the controlled process, the second column represents the output value contained in I/O data table 40 and the third column represents the output data contained in I/O data table 40'.

At a first interval in time shown in the first row of this table, the output value is '0' and a '0' is stored in the primary and secondary I/O data tables 40 and 40'. At a second later interval of time shown in the second column of the table in FIG. 3, the user program 32 may write a value of '1' to the I/O data table 40 and this value may be transmitted to the output. At a third later time interval in time shown by the third column of FIG. 3, the primary controller may switch-over control to the secondary controller 12(b)' prior to the scanning 48 of the I/O data table 40 updating the I/O data table 40' as would have occurred otherwise shown as a dotted arrow.

Immediately after the switch-over, shown in the fourth row of the table, a scanning of I/O data table 40' reads the old value of '0' from the secondary I/O data table 40' and writes it to the output returning the output value to '0'. Finally at the last column of FIG. 3, the user program of the secondary controller 12(b)' corrects the data value of the secondary I/O data table 40' as a result of the natural execution of the user program 32 and this value is written to the output value to restore it to '1'. This transition in the last three rows of the table of FIG. 3 of the output from '1' to '0' to '1' again is a data bump and is disruptive to a controlled process both because of the retrogressive state change from the new value of '1' to the old value of '0' (which would not have normally occurred) and because of the rapid toggling of the output value between '1', '0', and '1', which may adversely affect physical equipment with limited speed and response rates. Previous solutions include implementing a single large table, but this solution introduced the large data transfers by high priority tasks addressed by the present application.

Referring now to FIG. 4, the present invention provides for a processor module 16 in an industrial controller 12 allowing implementation of program-scoped tracking. Program-scoped tracking includes defining an additional area to be separately tracked and searched in detecting data that has been changed by one or more programs being executed.

Generally, the processor module 16 includes a processor 50, which may execute relay ladder, function block, structured text, and/or sequential function chart logic frequently used in the industrial control environment as well as general purpose arithmetic and logical instructions.

The processor 50 communicates with a memory 52 by means of an internal bus 54. Memory 52 may include volatile and non-volatile memory types well known in the art. The internal bus 54 also connects the processor 50 to input and output link buffers 56 handling communication of data on a backplane to other modules of the controller 12, including the I/O modules 18 and the communication modules 22 and 26.

The processor module 16 also includes write-detect circuitry 57 detecting writes of the processor 50 to certain addresses of the memory 52 as will be described.

Memory 52 includes an I/O data table 40 as described above and an I/O quarantine table 58 similar in size to the I/O data table. User programs 32 are also stored in memory 52 as well as a flag table 60 and a configuration register 62 as will be described. Although memory 52 is shown and described as a single memory, I/O table 58, flag table 60, and/or configuration register 62 may be implemented as separate areas on memory 52, on separate instances of memory 52, on multiple instances of memory 52, etc. in various embodiments configured to implement the functionality described herein.

Figure 5:
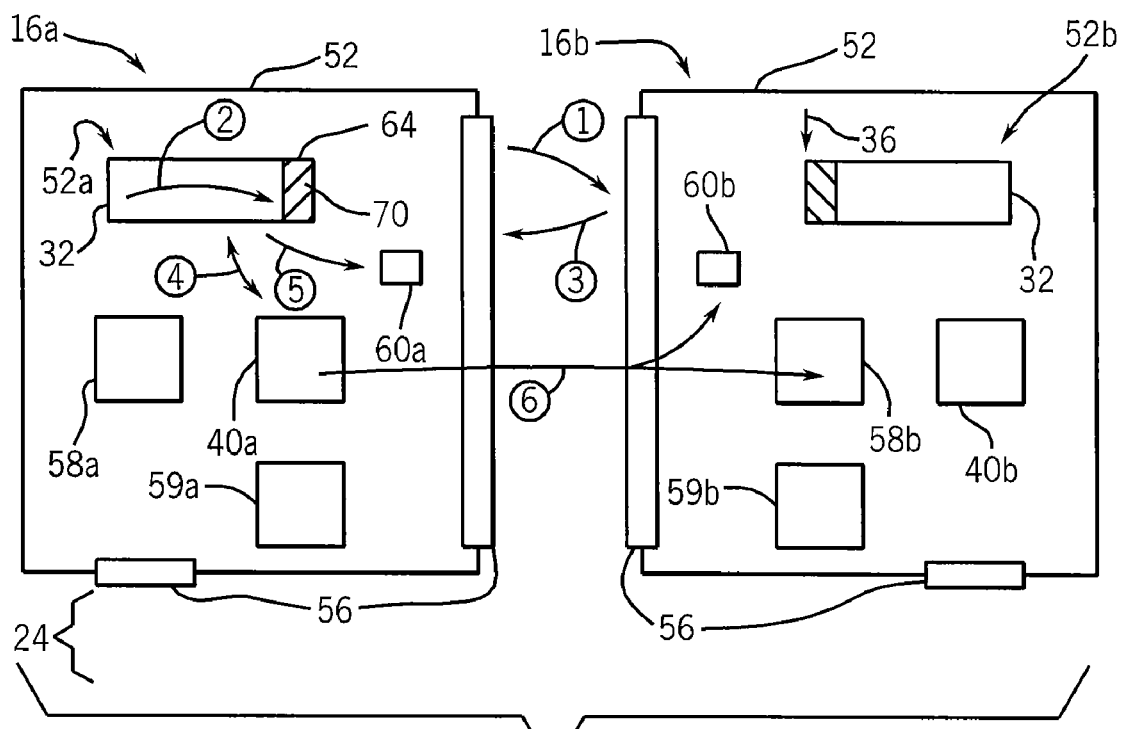
FIG. 5 is a simplified diagram of two controllers of FIG. 4 used as primary and secondary controllers showing a sequence of data flow used in the present invention.

Referring now to FIG. 5, the steps of synchronous data transfer between I/O data tables 40a and 40b of a primary processor 16(a) and secondary processor 16(b) begins when the primary processor 16(a) is ready to run a program 32. This program 32 may be one of several programs in the primary processor 16(a) distributed among several tasks of different priorities. The multi-tasking aspects of the present invention will be described below.

At the time primary processor 16(a) is ready to run a program 32, a message is transmitted to the secondary processor as indicated by the arrow labeled with a circled sequence number 1 indicating the order of the step in which the data transfer occurs. The message indicated by sequence number 1 includes an identification of the task which is running. A task may include one or more programs 32 from among many programs 32 that run sequentially within the task. Multiple tasks of differing priorities can run in the user's control application. The programs 32 may be contained in the memory 52 of the processor 16(a) and many instances of program 32 which may occur in object oriented programming systems.

As indicated by sequence arrow 2, processor 16(a) then begins execution of the user program. Upon completion, processor 16(a) then receives back from processor 16(b) an acknowledgment signal indicated by sequence number 3 indicating that processor 16(b) has queued itself at the start of program 32 matching the program instance number previously provided.

In the event of a switch-over of control to the secondary processor 16(b), the secondary processor 16(b) will begin execution of program 32 at its start. It should be noted that at the time of switch-over, the primary processor 16(a) will typically be executing instructions somewhere in the body of program 32 rather than at the start. Accordingly, at the time of switch-over, there will be some rollback by the secondary processor 16(b) in the point of program execution. Nevertheless, it can be assured that the correct program 32 will be executing and that the I/O data is consistent with that of the primary processor 16(a) when it was at the beginning of its program as will be seen. Significantly, in multi-program systems, the partitioning of each of the programs with their own separate data transmissions ensures that the rollback experienced during a switch-over will be minimized to no more than the length of one program within any one task.

Processor 16(a) begins exchanging data with the I/O quarantine table 58 as indicated by sequence arrow 4. Such data exchange includes writing output values to I/O data table 40a and reading input values from I/O data table 40a.

The input values of the I/O data table 40a may be asynchronously updated with new input values from the controlled process; however, no output values are transmitted to I/O data table 40a at this time.

Figure 6:
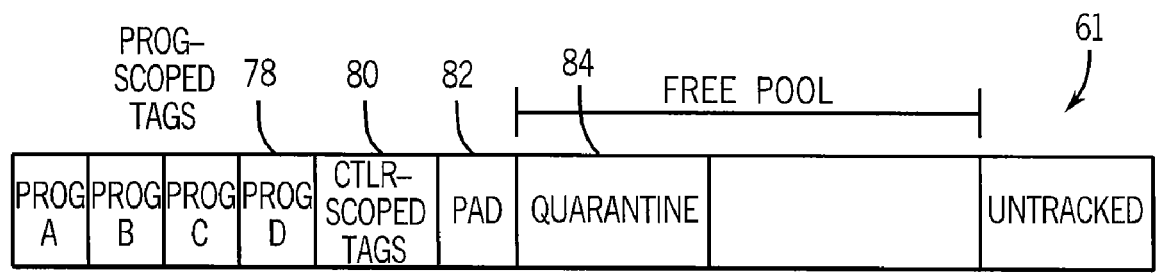
FIG. 6 is a simplified representation of a flag table including program-scoped data tags and controller scoped data tags.

At the time of each writing to I/O data table 40a as indicated by sequence number 4, if the writing is to an output value or to an internal variable to processor 16(a), a flag is set in flag table 60a as indicated by sequence arrow 5. This setting of the flag in the preferred embodiment is accomplished by specialized circuitry of the processor 16(a). Referring now to FIG. 6, an exemplary embodiment of a controller memory layout 61 is shown, controller memory layout 61 includes a program-scoped tags portion 78, a controller-scoped tags portion 80, a pad portion 82, and a quarantine portion 84. For the controller-scoped tags portion 80 and pad portion 82, traditional automatic searching, as is known in the prior art, may still be implemented. Specifically, the write lines to the I/O data table 40a are monitored and the range of addresses reserved for the I/O data table 40a detected. The I/O data table 40a is divided into program-scoped and controller-scoped subranges according to range values held in the configuration register 62 (shown in FIG. 4). When a write to memory is detected, the particular subrange is then determined and any change within a given sub-range results in the setting of a flag in the flag table 60a unique to that sub-range. Thus, each set flag indicates that there has been a writing of an output value to the I/O data table 40a within a range defined by start and ending values programmed into the configuration register 62. Hence at the conclusion of the execution of program 32, flags set in flag table 60a identify all changed output and internal variable values in the I/O data table 40a. Because this flag setting process may be accomplished by circuitry, detecting writes and ranges, it does not slow down the execution of the program 32 by processor 16(a).

For the program-scoped tag portion 78, each program may be restricted to search flags corresponding to a specific section of program-scoped tag portion 78 assigned to that specific program and several searches may be performed in parallel. The search of the specific portions may be accomplished by loading the boundaries of a particular program's tags at the start of a search. The search may be used to detect changed areas in a subset of the specific section of the program-scoped tag portion 78.

To implement the additional tracking of the program-scoped area, processor 16(a) may be configured to allocate a set of program-scoped tags for any program to begin on a tracking block boundary such that all program-scoped tags reside in a single contiguous block of memory. Allocation of controller-scoped tags would begin on a tracking block boundary and also exist in a (separate) contiguous block of memory. Processor 16(a) may maintain a listing of start and end addresses for the program-scoped tags for each program such that search and unwind routines, described in further detail below, may be properly initiated.

Referring now to FIGS. 1, 4, 5, and 6, ultimately, in the execution of any program 32 indicated by sequence number 3, a portion of program 32 termed a synchronization point 64 is reached. The synchronization point 64 begins a packet collection portion 70 of the program 32 that reviews the flags of flag table 60a (as are readable by processor 16(a)) and for each flag that is set takes data out of I/O data table 40a and forms a transmission packet that is loaded into the link buffer 56. The packet collection portion 70 merely needs to search through the flag table 60a and collect the necessary data, but need not attend the low level data transmission problems which are tended to by the link buffer 56. The link buffer communicates the transmission packet on the link 28 to processor 16(b) via module 26 and to a second quarantine table 58b as indicated by an arrow marked by sequence number 6. As the data is collected for transmission, the associated flags are reset.

Figure 7:
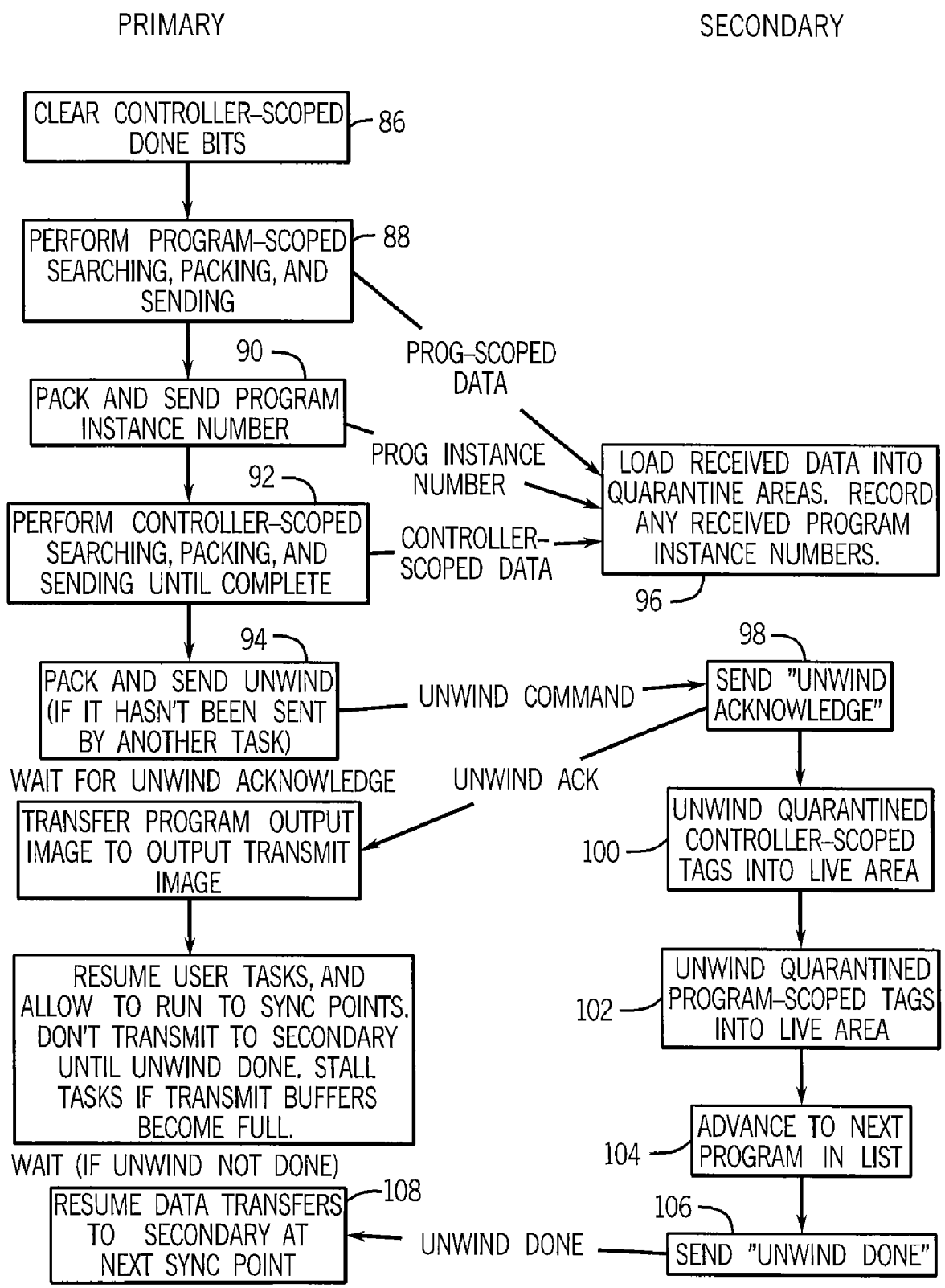
FIG. 7 is a flowchart illustrating execution of synchronization point activity for the transfer of data between a primary and a secondary industrial controller.

For example, referring now to FIG. 7, in a step 86, controller 16a will clear Done bits of the controller-scoped portion 80 of flag table 60a. Each Done bit indicates that a previous search of that section of the controller-scoped portion 80 has completed. The Done bits may also indicate to any preempted tasks that they do not need to transfer that section of the controller-scoped portion 80, since the data has already been sent by the preempting task.

In a step 88, the task at its sync point, will search the program-scoped tags portion 78 for the program that just completed. Controller 16a may be implemented such that a programmer may select which programs are followed by sync points, indicating that the program has completed. Controller 16a may also be configured such that the program-scoped tags portion 78 for any other programs that do not include sync points will also be searched and transferred. Upon completion of the program-scoped data tag search and transfer, the program instance number of the most recently completed program may be packed and sent in a step 90.

In a step 92, the task at its sync point may pack and transfer any controller-scoped tag changes. Controller 16a may be configured such that searches and transfers may be preempted and finished by higher priority tasks. At processor 16(b), in a step 96, the data of the transmission packets are received by the quarantine table 58b. This process of writing also serves to set flags in a second flag register 60b operating similarly to flag register 16(a) as has been previously described.

In a step 94, an unwind command may be sent at the end of the search. Processor 16(a) after it has finished collecting and sending transmission packets sends to processor 16(b), an 'unwind' signal (also indicated by sequence arrow 6) indicating a completion of the transmission and including an indication of the last packet sent. This unwind signal is necessary because the transmission of I/O data is not constant in length but depends on how much I/O data has changed. It will be understood that by transmitting only changed I/O data, however, the time required for transmission is much reduced. The data packets sent may contain an instance number indicating which program has been executed by the primary processor so that the secondary processor can take all programs, for data packets that it has received since the last unwind signal, off its run list when the unwind command is received.

The secondary processor 16(*b*) after receiving the unwind signal sends back an acknowledgment signal in a step 98, indicating that all the data has been received based upon the 'last packet' number of the unwind command. At this time, back up processor 16(*b*) begins to transfer the controller scoped tags from quarantine register 58*b* to I/O data table 40*b* and output transmit buffers 59*b* associated with processor 16(*b*) in a step 100. This latter transfer transfers only changed data as indicated by flag register 60*b* and is extremely rapid as it is being accomplished internally to the processor 16(*b*). Accordingly in the event of a switch-over, the data in I/O data table 40*b* can be assured of reflecting a single scanning of program 32 and thus of not being time fragmented. Controller 16(*b*) then transfers the program-scoped tags from quarantine register 58*b* to I/O data table 40*b* and output transmit buffers 59*b* associated with processor 16(*b*) in a step 102 and advances to through each program in a step 104.

If for some reason, the transmission process from processor 16(*a*) to processor 16(*b*) is interrupted, an unwind signal will not be received and no updating of 40*b* or 59*b* will occur.

Advantageously, implementation of the separate program-scope transfer can provide numerous benefits. Since data for lower priority tasks is transferred upon completion of the lower priority task, higher priority task will have increased performance and more consistent run time. Further, the highest priority tasks will not experience any data bumps where outputs will be changed back to previous states upon a switchover. Further, the frequency of data bumps for lower priority task will also be decreased since their program-scoped tags will be synchronized to a known-good state when in-process programs are restarted after a switchover.

The present invention is intended to be used in a multi-tasking system in which tasks include multiple programs and where different tasks of different priorities may interrupt or pre-empt each other. Low priority tasks may include any task not designated as high priority by the implementer of the industrial control system. Exemplary high priority tasks may include machine control, loops to be closed, timing critical operations, etc. Exemplary lower priority tasks may include report generation, data tracking, data trending, etc. Lower priority tasks often include data intensive operations where a lot of data is being operated upon.

Figure 8:
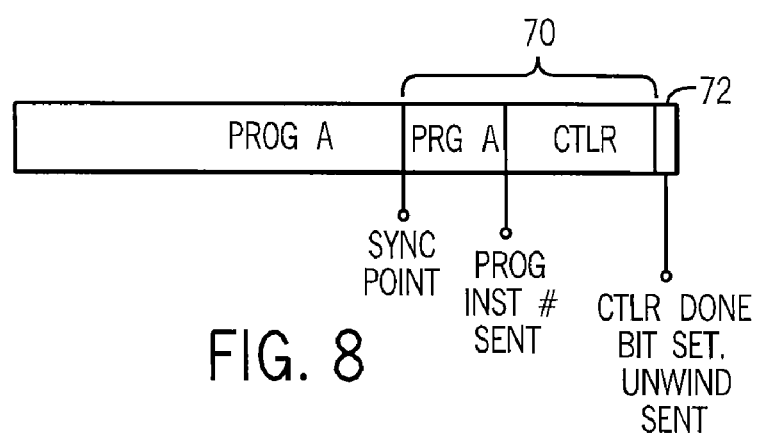
FIG. 8 is a task timeline showing execution of a program by an industrial controller of FIG. 4 showing synchronization and unwind points.

Referring now to FIG. 8 in the execution of a single task with a single program, program A, is shown, where the program has its own synchronization point. The synchronization point is followed by packet collection portion 70 undertaking the transfer data from the I/O data table 40*a* to the data quarantine table 58*b* as has been previously described. The packet collection portion 70 can include both of the program-scoped data tag changes and the controller-scoped data tag changes. The packet collection portion 70 concludes with the generation of an unwind signal 72. If a switchover happens before the Unwind command is sent, all of the partially-transferred data changes are discarded by processor 16(*b*) and program A is re-executed with the data sent from the prior sync point.

Figure 9:
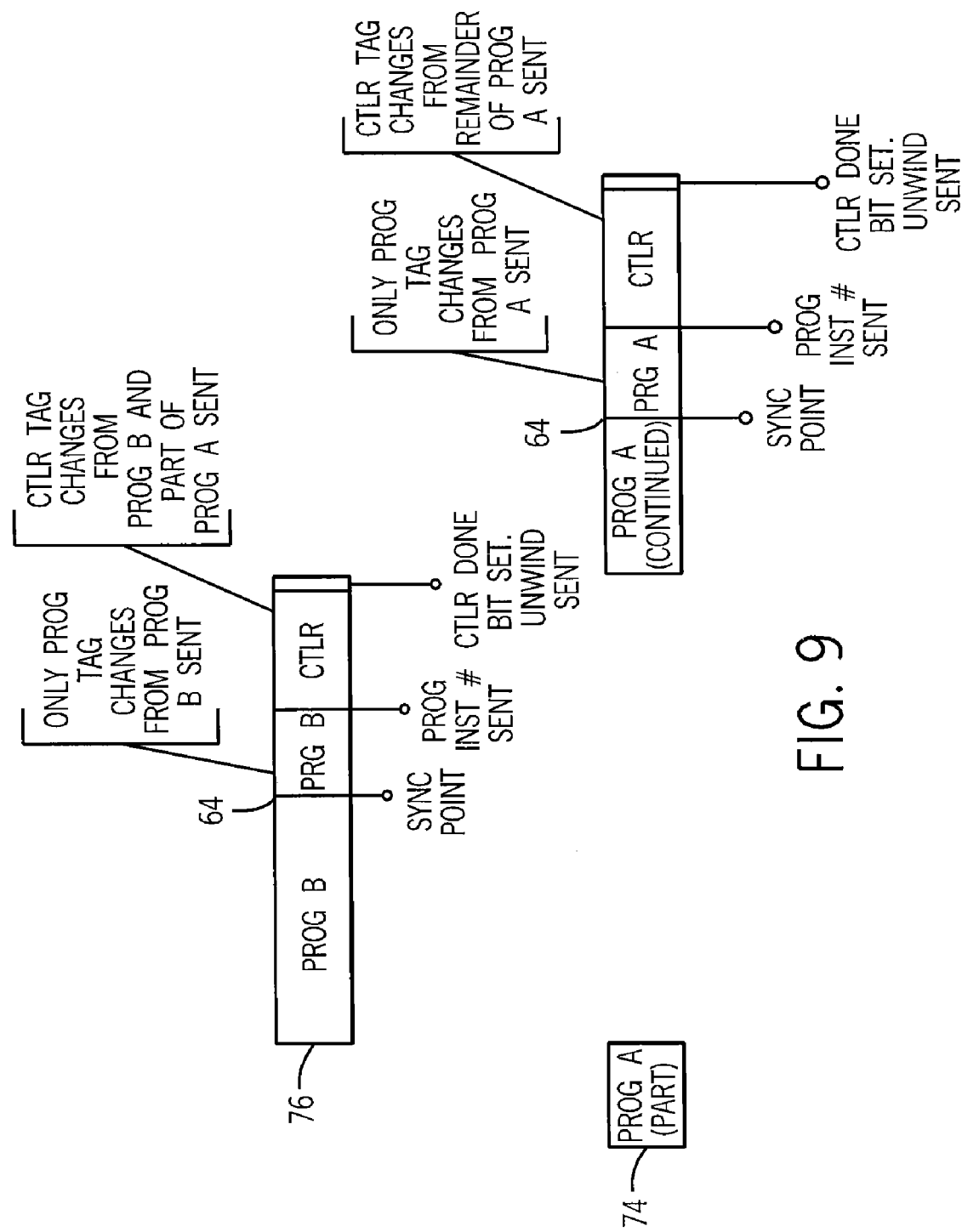
FIG. 9 is a figure similar to that of FIG. 8 showing execution of a lower priority task that is preempted by the execution of a higher priority task during execution of a program in the lower priority task.

Referring now to FIG. 9 in a multi-tasking system, a first program in a low priority task 74 may be preempted by a second program in a high priority task 76. In one case, the program A is pre-empted prior to reaching its synchronization point 64 by a program B. When program B reaches its synchronization point 64, it reviews the flag table 60*a* and transfers only the controller-scoped tag data indicated as having been changed including the controller-scoped tag data changed during the execution of program A. Program B sends an unwind signal causing the controller-scoped tag data of program A and B to be accepted by the secondary processor. For both program A and program B, following the sync point 64, the program-scoped data tags including only the changes from the particular program is sent first, followed by the controller-scoped data tags including the global controller tag changes from any program.

Figure 10:
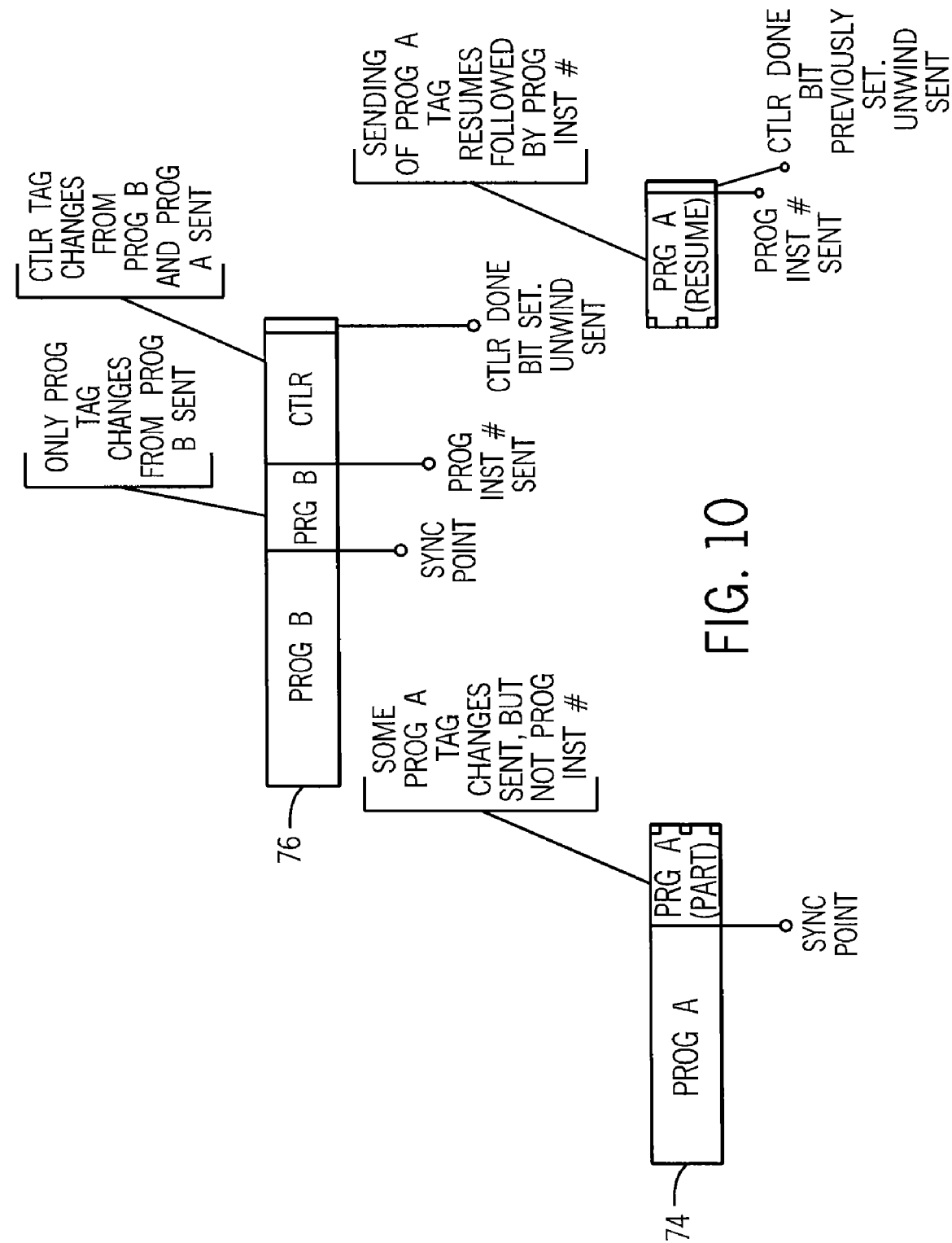
FIG. 10 is a figure similar to that of FIG. 9 showing execution of a lower priority task that is preempted by the execution of a higher priority task during transfer of program-scoped data tags.

Referring now to FIG. 10 in a more complex circumstance, program A of a low priority task 74 is preempted by program B of a high priority task 76 after the synchronization point 64 of program A has been reached but prior to completion of the program-scoped data tag transfer of program A and transfer of the program instance number. In this case, controller-scoped data of program A is transmitted by program B which can distinguish between transmitted and untransmitted packets by the resetting of the controller-scoped flags of the flag table 60*a* as packets are collected. Since the higher priority task 76 is able to run to completion, it completes its sync point activities, including the transfer of all controller-scoped tags that were changed by lower priority task 74. When control returns to lower priority task 74, it conducts the transfer of its program-scoped data tags, but does not need to transfer any controller-scoped data tags since that process was completed in task 76. Program A will still send an unwind command to processor 16*b* to allow the secondary to determine that program A has completed and that the Program A data tags may be moved out of the quarantine.

Figure 11:
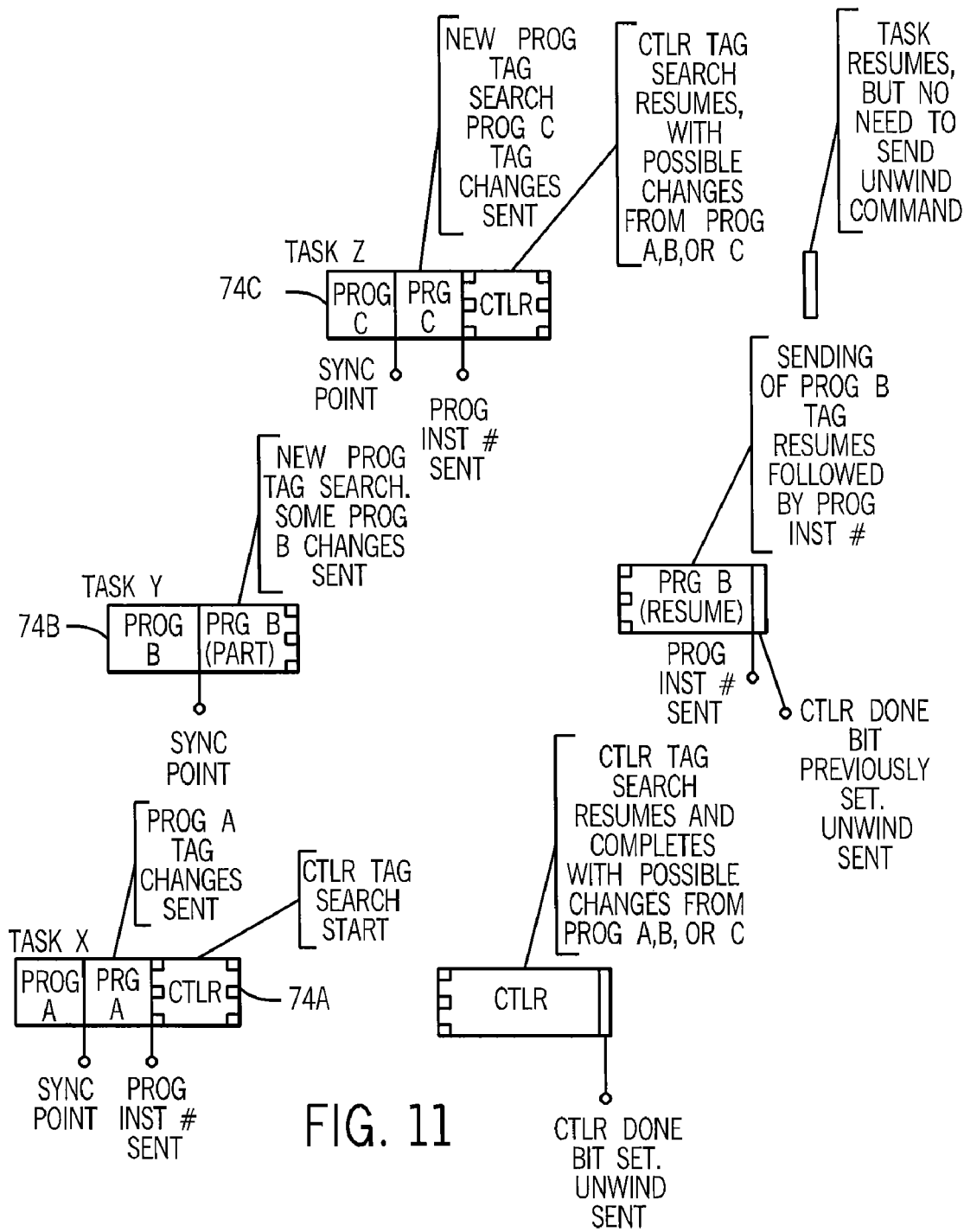
FIG. 11 is a figure similar to that of FIG. 10 showing execution of multiple lower priority tasks in a time slicing environment where task preemption occurs at various points.

Referring now to FIG. 11, task preemption may occur where equal priority tasks 74*a*, 74*b*, and 74*c* may be active at the same time. In a multi-taking system, task context may be switched at regular time intervals, known as time-slicing, before the completion of a transfer. Context switching may occur during program-scoped searching and tag transfers with resumption of the search and transfer occurring upon return. Context switching may also occur during controller-scoped tag searching and transfer, with the possibility that the preempting task has changed controller-scoped tags that have already been searched. If a switchover occurs at any time between the start of a timeline until just before the first unwind command, any task that has started running will roll back to the beginning of any programs that were running at the time of the switchover, using data that was unwound from the last sync point.

If a switchover happens after the first unwind command, but before a second unwind command, tasks 74*a* and 74*c*, having sent the program instance numbers of Program A and Program C will advance with all of the program and controller scoped tag changes that were made. Task 74*b* will roll back and re-execute program B with local tag values from the last sync point since it was unable to send its program instance number prior to the switchover. If a switchover occurs after the second unwind command is sent, task 74*b* will advance with all of the program and controller scoped tag changes that were made.

In the use cases shown in FIGS. 8-11, it can be seen that there are times when it is necessary for a task to send an Unwind command at the end of the sync point processing and other times when it is not necessary. Processor 16*a* may be configured to send an unwind command when a task completes the controller scoped tag search such that it is the first to see the controller-scoped Done bits and when the task completes its program-scoped tag search and finds that the controller-scoped Done bits are already set.

It is specifically intended that the present invention not be limited to the embodiments and illustrations contained herein and the claims should be understood to include modified forms of those embodiments including portions of the embodiments and combinations of elements of different embodiments as come within the scope of the following claims.

We claim:

1. A primary industrial controller exchanging input and output signals with a controlled process and communicating with a secondary industrial controller over a link, comprising:
    (a) a memory holding:
        (i) at least one user program describing the control of the controlled process;
        (ii) an I/O data table holding values of the output signals exchanged with the controlled process;
        (iii) a flag table having controller-scoped flags and program-scoped flags, the controller-scoped flags indicating changes to the I/O data table caused by one or more user programs, the program-scoped flags indicating changes to the I/O data table specific to one user program caused by execution of the specific user program;
    (b) a processor communicating with the memory and operating to
        (i) execute the user programs to write values of the output signals to the I/O data table according to the user programs at a first predetermined time;
        (ii) set controller-scoped flags in the flag table indicating changes in the I/O data table caused by execution of the user programs;
        (iii) set program-scoped flags in the flag table indicating changes in the I/O data table caused by execution of the user programs; and
        (iv) at a second predetermined time after the first predetermined time, transmit to the secondary industrial controller the values of output signals in the I/O data table that have changed as indicated by the set controller-scoped flags of the flag table and the values of output signal in the I/O data table that have changed as indicated by the set program-scoped flags of the flag table for programs that have completed;
    wherein at an arbitrary switch-over time, the primary industrial controller ceases execution of the user programs and the secondary industrial controller begins execution of the user programs, the secondary industrial controller using transmitted values of the output signals.

2. The primary industrial controller of claim 1, wherein the second predetermined time is following a sync point for a completed user program.

3. The primary industrial controller of claim 1, wherein the I/O data table is divided into ranges of addresses and wherein the controller-scoped flags are maintained in a first contiguous range of addresses.

4. The primary industrial controller of claim 3, wherein the program-scoped flags are maintained in a second contiguous range of addresses.

5. The primary industrial controller of claim 1, wherein the changes in the I/O data table are detected by writing to the flag table.

6. The primary industrial controller of claim 1, wherein the processor resets the flags of the flag table as the changed values of the I/O table are transmitted to the secondary industrial controller.

7. The primary industrial controller of claim 1, wherein the processor further operates to:
    (iv) at a third predetermined time after transmitting the changed values of the I/O data table, transmits to the secondary industrial controller an unwind command indicating completion of the transmission of changed values of the I/O table.

8. The primary industrial controller of claim 7, wherein the processor is configured to send the unwind command when a search and transfer of the controller-scoped flags is completed.

9. The primary industrial controller of claim 8, wherein the processor is configured to send the unwind command when a search and transfer of the program-scoped flags is completed and completion of the search and transfer of the controller-scoped flags is detected.

10. A method of providing a back-up for a primary industrial controller exchanging input and output signals with a controlled process and communicating with a secondary industrial controller over a link, the primary industrial controller including a processor communicating with a memory, the memory holding a user program for describing the control of the controlled process, an I/O data table holding values of the input and output signals exchanged with the controlled process, and a flag table holding flags indicating changes to the I/O data table, the method comprising the steps of:
    (a) after a first predetermined time executing the user program to read and write to the I/O data table according to the user program;
    (b) setting controller-scoped flags in the flag table indicating changes to controller data in the 1/O data table of step (a) caused by control of the controlled process;
    (c) setting program-scoped flags in the flag table indicating changes to program-specific data in the I/O data table of step (a) caused by control of the controlled process;
    (d) at a second predetermined time after the first predetermined time, communicating to the secondary processor only the values of the I/O data table that have changed as indicated by the set flags of the flag table to the secondary processor; and
    (e) at an arbitrary switch-over time, causing the primary industrial controller to cease execution of the user program and the secondary industrial controller to begin execution of the user program, with the secondary industrial controller using transmitted values of the output signals.

11. The method of claim 10, wherein the second predetermined time is following a sync point for a completed user program.

12. The method of claim 10, wherein the I/O data table is divided into ranges of addresses and wherein the controller-scoped flags are maintained in a first contiguous range of addresses.

13. The method of claim 12, wherein the program-scoped flags are maintained in a second contiguous range of addresses.

14. The method of claim 10, wherein the changes in the I/O data table are detected by writing to the flag table.

15. The method of claim 10, wherein the processor resets the flags of the flag table as the changed values of the I/O table are transmitted to the secondary industrial controller.

16. The method of claim 10, wherein the processor further operates to:
    (iv) at a third predetermined time after transmitting the changed values of the I/O data table, transmits to the secondary industrial controller an unwind command indicating completion of the transmission of changed values of the I/O table.

17. The method of claim 16, wherein the processor is configured to send the unwind command when a search and transfer of the controller-scoped flags is completed.

18. The method of claim 16, wherein the processor is configured to send the unwind command when a search and transfer of the program-scoped flags is completed and completion of a search and transfer of the controller-scoped flags is detected.

* * * * *